US012582976B2

(12) United States Patent
Munding et al.

(10) Patent No.: US 12,582,976 B2
(45) Date of Patent: Mar. 24, 2026

(54) DEVICES AND METHODS FOR RADIALLY-ZONED CATALYST COATING

(71) Applicant: BASF CORPORATION, Florham Park, NJ (US)

(72) Inventors: Andreas R. Munding, Madison, AL (US); Sandip D. Shah, East Brunswick, NJ (US); Kai Schmitz, Stoeckse (DE); Yi Liu, Livingston, AL (US); Donald H. Reeder, Huntsville, AL (US); Brian T. Jones, Huntsville, AL (US); Eric George Klauber, Huntsville, AL (US); James Dale Hoggard, Harvest, AL (US); Yogeshkumar Patel, Madison, AL (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 209 days.

(21) Appl. No.: 17/759,291

(22) PCT Filed: Jan. 22, 2021

(86) PCT No.: PCT/US2021/014526
§ 371 (c)(1),
(2) Date: Jul. 22, 2022

(87) PCT Pub. No.: WO2021/150830
PCT Pub. Date: Jul. 29, 2021

(65) Prior Publication Data
US 2023/0073880 A1 Mar. 9, 2023

Related U.S. Application Data

(60) Provisional application No. 62/964,199, filed on Jan. 22, 2020.

(51) Int. Cl.
*B01J 37/02* (2006.01)
*B01J 35/56* (2024.01)
(Continued)

(52) U.S. Cl.
CPC .......... *B01J 37/0228* (2013.01); *B01J 35/56* (2024.01); *F01N 3/2828* (2013.01);
(Continued)

(58) Field of Classification Search
CPC ............. B01D 53/944; B01D 2255/903; B01J 37/0228; B01J 35/56; F01N 3/2828;
(Continued)

(56) References Cited

U.S. PATENT DOCUMENTS 4,550,034 A * 10/1985 Shimrock ............ B01J 37/0215
502/514
5,127,960 A 7/1992 Dittrich et al.
(Continued)

FOREIGN PATENT DOCUMENTS

CN 102781586 A 11/2014
JP 3754095 B2 * 3/2006
(Continued)

OTHER PUBLICATIONS

Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.
(Continued)

*Primary Examiner* — Brian K Talbot
(74) *Attorney, Agent, or Firm* — DLA Piper LLP (US)

(57) ABSTRACT
This disclosure relates to devices and methods for coating various portions of catalyst support bodies, such as radially-
(Continued)

zoned catalyst support bodies, such as those used in catalytic converters for treating exhaust gas streams of internal combustion engines.

11 Claims, 11 Drawing Sheets

(51) Int. Cl.
*F01N 3/28* (2006.01)
*B01D 53/94* (2006.01)

(52) U.S. Cl.
CPC ...... *B01D 53/944* (2013.01); *B01D 2255/903* (2013.01); *F01N 2330/06* (2013.01); *F01N 2330/30* (2013.01)

(58) Field of Classification Search
CPC . F01N 2330/06; F01N 2330/30; B05D 1/002; B05D 1/18
USPC ......................................................... 427/232
See application file for complete search history.

(56) References Cited

U.S. PATENT DOCUMENTS

| | | | | |
|---|---|---|---|---|
| 6,171,556 | B1 | 1/2001 | Burk et al. | |
| 6,478,874 | B1 * | 11/2002 | Rosynsky | B05D 3/042 |
| | | | | 118/63 |
| 6,548,105 | B2 * | 4/2003 | Kiessling | C04B 41/4539 |
| | | | | 427/430.1 |
| 6,627,257 | B1 * | 9/2003 | Foerster | B01J 37/0215 |
| | | | | 427/430.1 |
| 7,524,465 | B2 * | 4/2009 | Kumar | F01N 13/0097 |
| | | | | 422/180 |
| 7,678,416 | B2 * | 3/2010 | Suzuki | B01J 37/0215 |
| | | | | 427/230 |
| 8,003,035 | B2 * | 8/2011 | Ito | B28B 11/006 |
| | | | | 264/517 |
| 8,889,227 | B2 * | 11/2014 | Guo | B01J 37/0232 |
| | | | | 427/350 |
| 9,186,662 | B2 * | 11/2015 | Schmitz | B05C 13/02 |
| 9,415,365 | B2 | 8/2016 | Chandler et al. | |
| 10,737,207 | B2 * | 8/2020 | Soga | B01D 46/2418 |
| 2002/0066982 | A1 * | 6/2002 | Yamaguchi | C04B 35/66 |
| | | | | 156/278 |
| 2004/0001781 | A1 * | 1/2004 | Kumar | B01J 23/44 |
| | | | | 422/177 |
| 2006/0257620 | A1 * | 11/2006 | Noguchi | B01D 46/0001 |
| | | | | 428/116 |
| 2008/0145531 | A1 * | 6/2008 | Rosynsky | B05D 3/042 |
| | | | | 427/231 |
| 2011/0135833 | A1 * | 6/2011 | Schmitz | B01J 37/0215 |
| | | | | 118/503 |
| 2012/0114853 | A1 * | 5/2012 | Schmitz | B01J 37/0215 |
| | | | | 118/406 |

FOREIGN PATENT DOCUMENTS

| | | |
|---|---|---|
| KR | 960011430 B1 | 8/1996 |
| WO | 99/47260 A1 | 9/1999 |
| WO | 2016/070090 A1 | 5/2016 |

OTHER PUBLICATIONS

International Search Report for PCT Patent Application No. PCT/US2021/014526, Issued on May 18, 2021, 5 pages.

* cited by examiner

DEVICES AND METHODS FOR RADIALLY-ZONED CATALYST COATING

CROSS-REFERENCE TO RELATED APPLICATIONS

This application is a national stage filing under 35 U.S.C. 371 of PCT/US2021/014526, filed on Jan. 22, 2021, which claims the benefit of priority to U.S. Provisional Application No. 62/964,199, filed on Jan. 22, 2020, which applications are hereby incorporated in their entirety by reference in this application.

This disclosure relates to devices and methods for coating a catalyst support body, such as a radially-zoned catalyst support body. Catalyst support bodies are used, for example, for treating exhaust gas streams of an internal combustion engine, such as a diesel engine.

Generally, techniques for introducing catalyst material into a monolithic catalyst support body involve introducing a first open end of the support body into the slurry and drawing the slurry through the channels of the catalyst support body. However, since one of the open ends of the support body necessarily contacts the slurry, a part of the outer surface of the support body is wetted or coated with slurry.

Typically, a catalyst material includes precious metals, which are not involved in catalytic reactions since the outer surface of the catalyst support body is not in contact with exhaust gases during operation due to the canning surrounding the catalyst support body. Thus, not all of the catalyst material is used in an efficient way. In order to regain the unused catalyst material, the outer surface of the support body is cleaned, brushed or blasted. In this way, some of the material can be regained and the outer surface can be provided in a clean way, which is important, for example, if the canning involves welding. However, at the same time, the manufacturing of such a catalyst support body is relatively costly due to the additional cleaning and regaining steps. In addition, not all of the unused material on the outside of the support body can be regained.

The present disclosure therefore provides devices and methods for coating a catalyst support body with an outer surface free from catalyst material.

In one aspect, there is provided a method of coating a catalyst support body comprising the steps of (a) providing a catalyst slurry via a pan, where the pan includes a reservoir configured to receive the slurry, a sealing cover configured to receive the catalyst support body, and a plurality of spring-loaded rods configured to couple the cover to the pan; (b) introducing the catalyst support body to the sealing cover; (c) introducing an open input end of the catalyst support body into the catalyst slurry; (d) directing an amount of the catalyst slurry through the input end and into an inner portion of the catalyst support body; (e) removing the catalyst support body from the catalyst slurry; (f) rotating the catalyst support body relative to the pan; and (g) directing the catalyst slurry within the catalyst support body towards an open output end of the catalyst support body.

In another aspect, there is provided a method of coating a catalyst support body comprising the steps of (a) providing a catalyst slurry via a slurry pan; (b) coupling a sealing cover to the slurry pan via a plurality of spring-loaded rods, where the sealing cover is configured to receive the catalyst support body and seal at least a portion thereof; (c) introducing the catalyst support body to the sealing cover; (d) introducing an open input end of the catalyst support body into the catalyst slurry; (e) directing an amount of the catalyst slurry through the input end and into an inner portion of the catalyst support body; (f) removing the catalyst support body from the catalyst slurry; (g) rotating the catalyst support relative to the pan; and (h) directing the catalyst slurry within the catalyst support body towards an open output end of the catalyst support body.

In another aspect, there is provided a method of coating a catalyst support body. The method includes the steps of (a) coupling a sealing cover to a clamping mechanism configured to interface with the catalyst support body, where the sealing cover is configured to receive the catalyst support body and seal at least a portion thereof and includes a plurality of spring-loaded rods configured to interface with a slurry pan; (b) introducing the catalyst support body to the sealing cover; (c) introducing an open input end of the catalyst support body into a catalyst slurry within the slurry pan; (d) directing an amount of the catalyst slurry through the input end and into an inner portion of the catalyst support body; (e) removing the catalyst support body from the catalyst slurry; (f) rotating the catalyst support body relative to the pan; and (g) directing the catalyst slurry within the catalyst support body towards an open output end of the catalyst support body.

In some embodiments of the foregoing aspects, the catalyst support body can be rotated about 180 degrees relative to the pan, for example, 180 degrees+/−30 degrees, +/−15 degrees, +/−5 degrees, or essentially+/−0 degrees. In some embodiments, the cover includes an impermeable sealing surface configured to seal against at least one of face or a circumferential edge of the input end of the catalyst support body to prevent contact between an outer surface of the catalyst support body and the catalyst slurry. The cover can also be configured to prevent axial flow of the slurry through a radial portion of the face and/or to prevent axial flow of the catalyst slurry through an outer ring area of the face. The orientation of the cover can be adjustable relative to the pan.

In some embodiments, the step of introducing the catalyst support body to the cover includes transporting the catalyst support body via a clamping mechanism configured to press the catalyst support body into the cover to create a seal therebetween. In some embodiments, the step of introducing an open input end of the catalyst support body into the catalyst slurry comprises compressing the spring-loaded rods to provide a sealing force against the catalyst support body. In some embodiments, the step of directing an amount of the catalyst slurry through the input end comprises applying a pressure differential between the input end of the catalyst support body and an output end of the catalyst support body. In some embodiments, the step of removing the catalyst support body from the catalyst slurry comprises separating the catalyst support body from the cover. In some embodiments, the step of rotating the catalyst support body is carried out via a clamping mechanism secured to the catalyst support body via a rotary mechanism. In some embodiments, the step of directing the catalyst slurry within the catalyst support body towards an open output end of the catalyst support body comprises directing a flow of air into the open input end of the catalyst support body.

In some embodiments, the method further comprises the steps of introducing the catalyst support body to a second sealing cover configured to seal a different portion of the catalyst support body, introducing either the open output end or the open input end of the catalyst support body into a second catalyst slurry, directing an amount of the second catalyst slurry into a second inner portion of the catalyst support body, removing the catalyst support body from the second catalyst slurry, rotating the catalyst support body relative to the pan, and directing the catalyst slurry within the catalyst support body towards an open end of the catalyst support body. In some embodiments, the second catalyst slurry may be provided in the same pan as the first catalyst slurry. In some embodiments, the second catalyst slurry may be provided in a second pan.

In another aspect, there is provided a device for enabling radial coating of a catalyst support body with a coating station comprising a slurry pan and a clamping mechanism. In some embodiments, the device comprises a sealing cover configured to releasably hold the catalyst support body and seal against a face or circumference of an input end of the catalyst support body to prevent contact between an outer surface of the catalyst support body and a catalyst slurry. In some embodiments, the device comprises a plurality of spring-loaded rods configured to couple the sealing cover to the slurry pan. In some embodiments, the coating station is a conventional coating station.

In another aspect, there is provided a device for enabling radial coating of a catalyst support body with a coating station comprising a slurry pan and a clamping mechanism. In some embodiments, the device comprises a sealing cover configured to seal against a face or circumference of an input end of the catalyst support body to prevent contact between an outer surface of the catalyst support body and a catalyst slurry. In some embodiments, the device comprises a plurality of spring-loaded rods configured to interface with the slurry pan, where the sealing cover is configured to couple to a clamping mechanism configured to releasably hold the catalyst support body. In some embodiments, the coating station is a conventional coating station.

In some embodiments of the foregoing aspects, the sealing cover can be configured to prevent axial flow of the slurry through a radial portion of the face of the catalyst support body and/or to prevent axial flow of the catalyst slurry through an outer ring area of the face. In some embodiments, the device may also comprise a rotary mechanism coupled to the clamping mechanism and configured to rotate the catalyst support body about 180 degrees, such as, for example, 180 degrees+/−30 degrees, +/−15 degrees, +/−5 degrees, or essentially +/−0 degrees. In some embodiments, the device comprises an actuator coupled to the rotary mechanism and configured to drive the rotation of the catalyst support body.

In another aspect, there is provided a coating station for applying a catalyst to at least a portion of an inside surface area of a catalyst support body. In some embodiments, the station comprises a platform with a slurry pan, in which a catalyst slurry can be located; a clamping mechanism configured to releasably grasp the catalyst support body and provide relative motion thereto with respect to the slurry pan; a sealing cover configured to seal against a face or circumference of an input end of the catalyst support body to prevent contact between an outer surface of the catalyst support body and a catalyst slurry; and a plurality of spring-loaded rods configured to interface with the slurry pan.

In some embodiments, the sealing cover is further configured to prevent contact with a portion of the face of the catalyst support body and any axial passageways extending therefrom. In some embodiments, the sealing cover can also be configured to be releasably coupled to the clamping mechanism. In some embodiments, the coating station comprises a second sealing cover also configured to be releasably coupled to the clamping mechanism, where the sealing covers are interchangeable to provide different sealing configurations to the face of the catalyst support body. In some embodiments, the plurality of spring-loaded rods can be configured to couple the sealing cover to the slurry pan. In some embodiments, the clamping mechanism can be further configured to provide vertical movement to the catalyst support body so as to immerse an open end of the catalyst support body into the slurry pan and to also remove it therefrom.

In some embodiments, the coating station comprises a rotary mechanism coupled to the clamping mechanism and configured to rotate the catalyst support body about 180 degrees, such as, for example, 180 degrees+/−30 degrees, +/−15 degrees, +/−5 degrees, or essentially +/−0 degrees. In some embodiments, the coating station comprises an actuator coupled to the rotary mechanism and configured to drive the rotation of the catalyst support body. In some embodiments, the coating station comprises a movable hood configured to sealingly contact one or more of an upper open end of the catalyst support body, an upper surface of the clamping mechanism, and an upper surface of the platform to apply a pressure to a volume enclosed by the hood. In some embodiments, the coating station comprises a second platform having a second slurry pan, in which a second catalyst slurry can be located; and a second sealing cover configured to seal against a different portion of the face of the input end of the catalyst support body to prevent contact between the second catalyst slurry and both the outer surface of the catalyst support body and the different portion of the face and any axial passageways extending therefrom.

In order to provide an understanding of embodiments of the present disclosure, reference is made to the appended drawings, in which reference numerals refer to components of exemplary embodiments of the disclosure. The drawings are exemplary only and should not be construed as limited the present disclosure. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among to indicate corresponding or analogous elements.

Figure 1A:
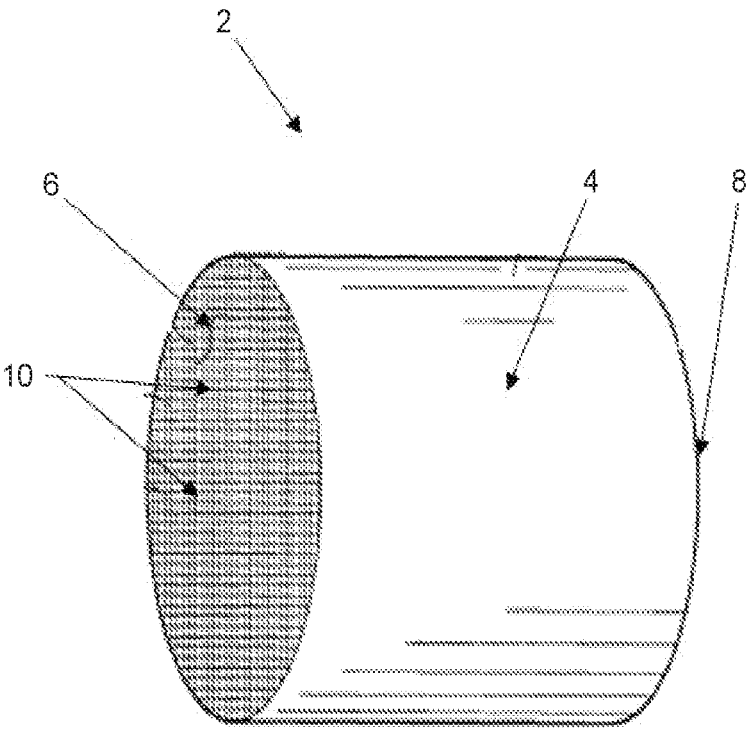
FIG. 1A is a perspective view of a honeycomb-type substrate which may be coated with a device in accordance with one or more embodiments of the present disclosure.
Figure 1B:
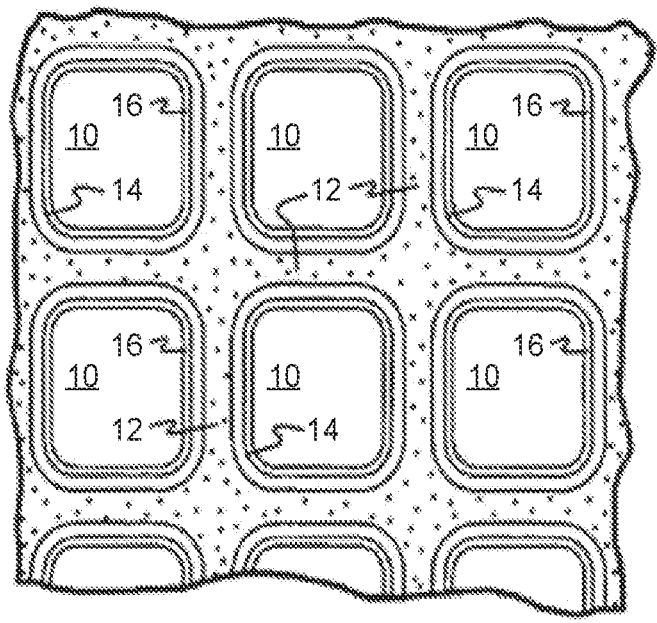
FIG. 1B is a partial, enlarged cross-sectional view of the substrate of FIG. 1A taken along a plane parallel to the end faces of the substrate to show a plurality of the gas flow passages in accordance with one or more embodiments of the present disclosure.

FIGS. 1A and 1B illustrate an exemplary substrate 2 coated with a catalyst composition as described herein, i.e., a catalyst support body. In some embodiments, the catalyst support body 2 is a flow-through substrate, such as a flow-through honeycomb monolithic substrate. Typically, flow-through substrates have fine, parallel gas flow passages extending from an inlet end to an outlet end of the substrate, such that passages are open to fluid flow. The passages, which are essentially straight paths from their fluid inlet to their fluid outlet, are defined by walls on which a catalytic coating is deposited so that gases flowing through the passages contact the catalytic material. The flow passages of the flow-through substrate can be thin-walled channels, which can be of any suitable cross-sectional shape and size such as trapezoidal, rectangular, square, sinusoidal, hexagonal, oval, circular, etc. The flow-through substrate can be ceramic or metallic as described herein. Flow-through substrates can, for example, have a volume of from about 50 in$^3$ to about 1200 in$^3$, a cell density (inlet openings) of from about 60 cells per square inch (cpsi) to about 900 cpsi, for example from about 200 to about 400 cpsi, with wall thicknesses of from about 50 to about 200 microns or about 400 microns. A catalytic composition can be applied to the substrate to create a catalytic article.

In some embodiments, any suitable substrate for the catalytic articles may be employed, such as, for example, the type having a plurality of fine, substantially parallel gas flow passages extending along the longitudinal axis of the substrate where, for example, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

Such monolithic wall-flow filter substrates may contain up to about 900 or more flow passages (or "cells") per square inch of cross-section, although far fewer may be used. For example, the substrate may have from about 7 to about 600, such as, for example, from about 100 to about 400 cells per square inch ("cpsi"). The cells can have cross-sections that are rectangular, square, circular, oval, triangular, hexagonal, or are of other polygonal shapes. The blocked or plugged ends can alternate with open passages, with each opposing end open and blocked, respectively. The wall-flow substrate also includes an inlet end, an outlet end, and porous cell walls configured for the exhaust gases to diffuse therethrough. The plugged ends prevent gas flow and encourage diffusion through the cell walls.

Wall-flow filter substrates typically have a wall thickness ranging from about 50 microns to about 2000 microns, such as, for example, from about 50 microns to about 450 microns or from about 150 microns to about 400 microns. The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of ≥50%, ≥60%, ≥65%, or ≥70%. For instance, in some embodiments, the wall-flow filter article substrate will have a wall porosity of from about 50%, about 60%, about 65% or about 70% to about 75%, about 80%, or about 85% and an average pore size of from about 5 microns, about 10, about 20, about 30, about 40 or about 50 microns to about 60 microns, about 70, about 80, about 90 or about 100 microns prior to disposition of a catalytic coating thereon. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Referring to FIG. 1A, the exemplary catalyst support body 2 shown has a cylindrical shape and a cylindrical outer surface 4; however, other shapes are contemplated and considered within the scope of the present disclosure and will be determined to suit a particular application. In some embodiments, the catalyst support body can have a cross-sectional shape corresponding to an oval, a rectangle, a trapezoid, a hexagon, etc. The catalyst support body 2 also includes an upstream (or inlet) end face 6 and a corresponding downstream (or outlet) end face 8, which may be identical to end face 6. The catalyst support body 2 may have a plurality of fine, parallel gas flow passages 10 formed therein. As seen in the exemplary embodiment of FIG. 1B, flow passages 10 are formed by walls 12 and extend through the catalyst support body 2 from the upstream end face 6 to the downstream end face 8, with the passages 10 being unobstructed so as to permit the flow of a fluid, e.g., a gas stream, longitudinally through the catalyst support body 2 via gas flow passages 10 thereof. As more easily seen in FIG. 1B, walls 12 may be dimensioned and configured so that gas flow passages 10 have a substantially regular polygonal shape. As shown in this exemplary embodiment, the catalyst composition can be applied in multiple, distinct layers, if desired. In the illustrated embodiment, the catalyst composition consists of both a discrete bottom layer 14 adhered to the walls 12 of the carrier member and a second discrete top layer 16 coated over the bottom layer 14. The present disclosure can be practiced with one or more (e.g., one, two, three, four, or more) catalyst composition layers and is not limited to the two-layer embodiment illustrated in FIG. 1B. Further coating configurations are disclosed hereinbelow.

To produce catalytic articles, a substrate, or catalyst support body as disclosed above, is coated with a catalytic composition. The coatings are "catalytic coating compositions" or "catalytic coatings." The terms "catalyst composition" and "catalytic coating composition" are synonymous. The catalytic coating may comprise one or more thin, adherent coating layers disposed on and in adherence to at least a portion of a substrate. In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual functional components, e.g., a first catalyst composition and a second catalyst composition, as described in more detail below.

A catalyst composition may typically be applied in the form of a wash-coat, containing support material having catalytically active species thereon. The catalyst composition can be mixed with water (if in dried form) to form a slurry for purposes of coating a catalyst substrate. In addition to the catalyst particles, the slurry may optionally contain alumina as a binder, associative thickeners, and/or surfactants (including anionic, cationic, non-ionic or ampho-teric surfactants). In some embodiments, the pH of the slurry can be adjusted, e.g., to an acidic pH of about 3 to about 5. When present, an alumina binder is typically used in an amount of about 0.02 $g/in^3$ to about 0.5 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 30-40 wt %. In some embodiments, the post-milling slurry is characterized by a D90 particle size of about 10 to about 50 microns (e.g., about 10 to about 20 microns). The D90 is defined as the particle size at which about 90% of the particles have a finer particle size. Exemplary coating compositions are disclosed hereinbelow.

The slurry can be coated on the catalyst substrate using a wash-coat technique known in the art. As used herein, the term "wash-coat" has its usual meaning in the art of a thin, adherent coating of a material applied to a substrate, such as a honeycomb flow-through monolith substrate or a wall-flow filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a wash-coat layer includes a compositionally distinct layer of material disposed on the surface of a monolithic substrate or an underlying wash-coat layer. A substrate can contain one or more wash-coat layers, and each wash-coat layer can have unique chemical catalytic functions.

In some embodiments, the substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final wash-coat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

The catalyst composition can be applied as a single layer or in multiple layers. A catalyst layer resulting from repeated wash-coating of the same catalyst material to build up the loading level is typically viewed as a single layer of catalyst. In some embodiments, the catalyst composition is applied in multiple layers with each layer having a different composition. In some embodiments, the catalyst composition can be zone-coated, meaning a single substrate can be coated with different catalyst compositions in different areas along the gas effluent flow path, as described below.

The wash-coat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s), and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned".

For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, such as, for example, about 5%, about 10%, about 20%, about 30%, about 40%, about 50%, about 60% or about 70% of the substrate length. Different layers may each extend the entire length of the substrate or may each extend a portion of the length of the substrate and may overlay or underlay each other, either partially or entirely. Each of the different layers may extend from either the inlet or outlet end.

As used herein, the phrase "radially-zoned oxidation regions" refers to applying different catalyst compositions to at least two different regions of a substrate of a catalytic article, such that the two or more oxidation regions each provide a different level of oxidation activity. As described above, a catalyst support body can include an inlet side and an outlet side, and a plurality of passageways extending from the inlet side to the outlet side. A first region can include a first subset of the plurality of passageways, while a second region can include a second subset of the plurality of passageways. For example, when viewing a cylindrical catalyst support body from a gas inlet side, one region can be an outer ring portion of a radial face that extends axially from the face along at least a portion of the length of the body, while a second region can be an inner circular region of the radial face that also extends some length of the body. It is noted that embodiments of the present disclosure are not limited to two regions. For example, a catalyst support body according to the present disclosure can include 3, 4, or more regions, each region comprising a subset of the plurality of passageways of the substrate (see, for example, FIG. 10). However, for the ease of discussion, only two regions are illustrated in the figures and referred to in the description of exemplary embodiments below.

In some embodiments, coating systems according to the present disclosure may include a clamping mechanism for holding a catalyst support body, a reservoir containing a catalyst slurry, and a sealing arrangement for preventing contact between an outer surface of the catalyst support body and the slurry. One example of such a system is disclosed in U.S. Pat. Publ. No. 2012/0114853, the entire disclosure of which is incorporated by reference herein.

Figure 3:
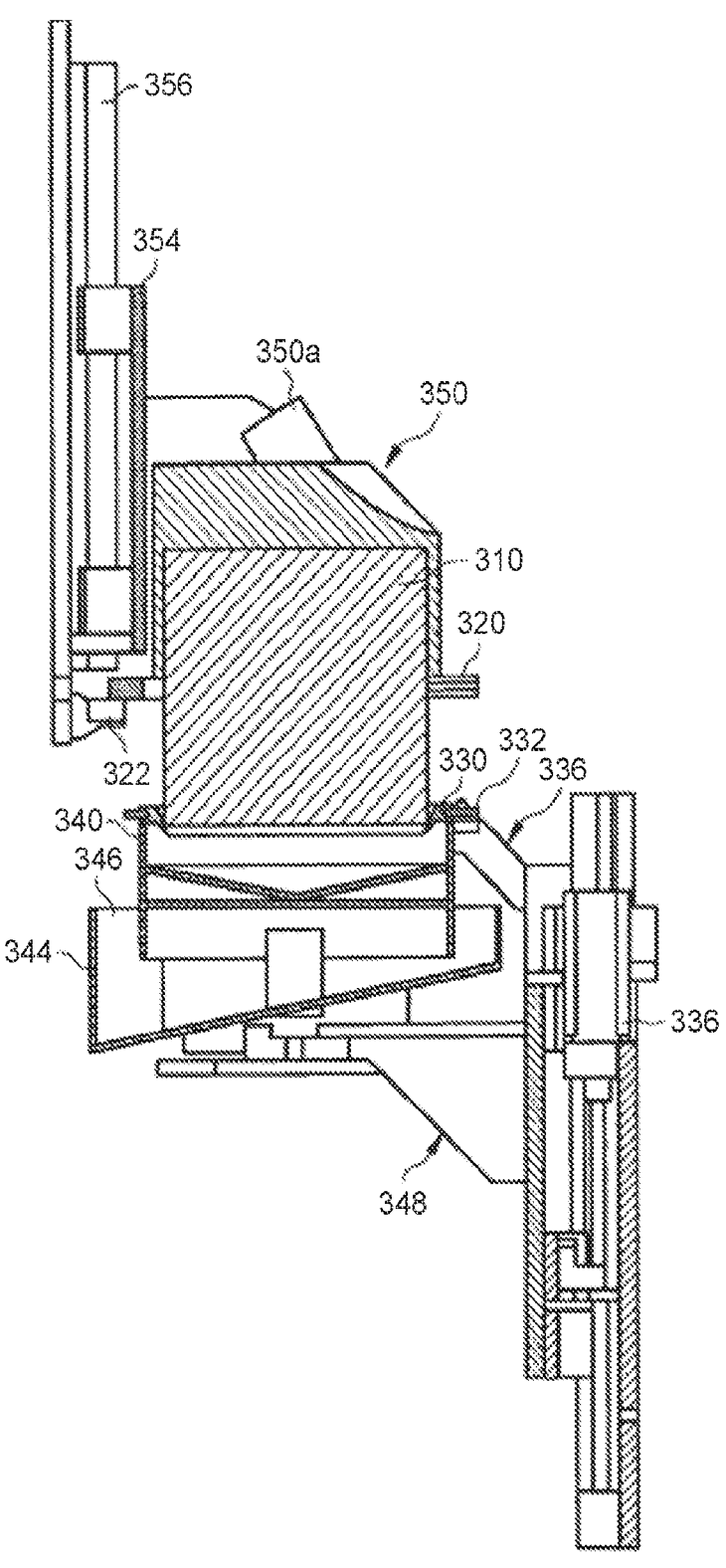
FIG. 3 is a schematic representation of an exemplary coating station in accordance with one or more embodiments of the present disclosure.

FIG. 3 shows an exemplary coating station in accordance with one or more embodiments of the present disclosure. The coating station comprises a loading platform 320 holding a catalyst support body 310. A sealing element 330 is supported by a sealing holder 332, which is connected to a lifting mechanism 336. In some embodiments, the sealing holder 332 may be connected with the lifting mechanism 336 via a quick-release fastener. In some embodiments, the lifting mechanism comprises an actuator section 336a, which comprises a spindle rod. The exemplary coating station of FIG. 3 may further comprise a pan 340, under which a receiving pan 344 may be located, which can receive residual slurry via an overrun 346.

In some embodiments, the coating station further comprises a moveable hood 350, which can be lifted/lowered from and onto the loading platform 320. In some embodiments, the hood is moveable and is connected to a lifting mechanism 354, which is held by a support 322. In some embodiments, the coating station comprises a pivoting device 356, which may be connected to the hood 350 via the lifting mechanism 354 for pivoting the hood eccentrically to the longitudinal axis of the loading platform 320 and the pan 340.

The exemplary coating station shown in FIG. 3 comprises a further lifting mechanism for lifting and lowering the pan 340. As shown, in some embodiments, the pan lifting mechanism 348 and the sealing element lifting mechanism 336 may be connected to the same support. Therefore, in some embodiments the exemplary coating station of FIG. 3 comprises three lifting mechanisms; a first lifting mechanism 336a. 336 for lifting and lowering the sealing holder, to which the sealing element is connected; a second lifting mechanism 348 for lifting and lowering the pan 340, and a third lifting mechanism 354 for lifting and lowering the hood 350. In some embodiments, the first lifting mechanism 336 for moving the sealing element as well as the second lifting mechanism 348 for moving the pan are attached to the same support via individually controllable actuators. In some embodiments, another individual support is used for holding the third lifting mechanism, which lifts and lowers the hood 350. In some embodiments, the third lifting mechanism 354 is combined with a pivoting device 356, which is arranged to pivot the hood 350 with a rotational axis provided eccentrically to the longitudinal axis of the vacuum hood, the pan, the loading platform and the sealing element. In some embodiments, the third lifting mechanism 354 is connected to a support 322.

In some embodiments, the hood 350 comprises an opening 350a for applying a positive or negative (i.e., vacuum) pressure to the inside of the hood 350. In some embodiments, the opening 350a is adapted to be connected to a pump (not shown).

In some embodiments, the lifting mechanisms can comprise guiding rods as well as an actuator element, such as, for example, a pneumatic or hydraulic piston or an electromagnetic actuator. In some embodiments, the support for the hood lifting mechanism is connected to the support for the lifting devices for the loading platform 322 and the sealing holder 336. In some embodiments, electrical servo-drives can be used for driving the lifting mechanisms, wherein each lifting mechanism is driven by an associated individual servo-drive. In some embodiments, gear mechanisms can be used for connecting the lifting mechanism with the respective servo-drive, such as, for example, a worm gear or a spindle gear assembly.

FIGS. 4A-4D show an exemplary catalyst support body 110 which is held within a loading platform 120. The exemplary support body has a cylindrical shape with two end faces depicted in FIGS. 4A-4D as a horizontal line. The loading platform 120 holds the support body at an outer surface which extends between both ends. In FIGS. 4A-4D, only a contact element of the loading platform 120 is shown in a symbolic way. The exemplary embodiment shown in FIGS. 4A-4D further comprises a sealing element 130 below an open input end 110a of the catalyst support body 110. In addition, a pan 140 is located below the support body 110 and the sealing element 130, where the slurry 142 is located within the pan 140.

Figures 4A, 4B, 4C, 4D:
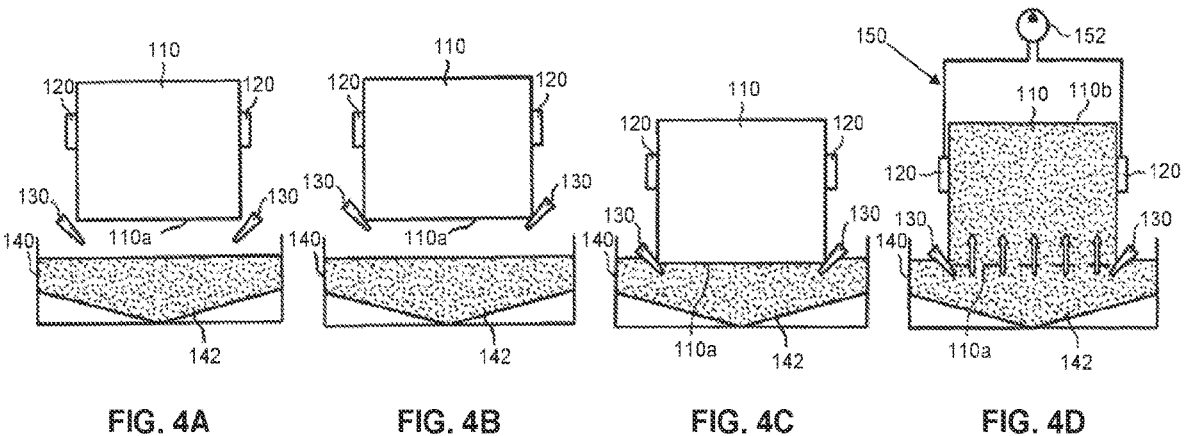
FIGS. 4A-4D depict a method of using the coating station of FIG. 3 in accordance with one or more embodiments of the present disclosure.

In a first step of the exemplary embodiment shown in FIG. 4A, the support body 110 is held by the loading platform 120 at a distance above the sealing element 130 and above the slurry 142. Then, the sealing element 130 is lifted to reach a position as shown in FIG. 4B. In this position, the sealing element covers the complete circumference of the input end 110a. This can be achieved by lifting the sealing element or a sealing holder holding the sealing element. In FIGS. 4A-4D, only the sealing element 130 is shown in a symbolic way, other parts of the cover mechanism including the sealing holder are described with respect to the exemplary embodiments illustrated in FIGS. 5-9.

After covering the circumference of the input end 110a by the sealing element 130 as shown in FIG. 4B, the pan 140 including the slurry 142 is lifted towards the support body 110 such that the surface provided by the slurry as well as the slurry itself contacts the input end 110a (as well as a part of the sealing element 130). It can be seen from FIG. 4C that the outer surface circumferentially enclosing the catalyst support body 110 is not in contact with the slurry 142, in particular the section above the circumference of the input end 110a is not in contact with the slurry 142. However, at the same time, the complete input end 110a of the support body 110 is immersed in the slurry. At a subsequent step shown in FIG. 4D, vacuum is applied to an open end 110b of the support body 110 opposed to the input end 110a. The end 110b of the support body 110, opposed to the input end 110a is open and is connected to the open input end 110a via internal channels of the support body 110. A moveable hood 150 is lowered onto the catalyst support body 110, partly enclosing the support body 110 and briefly enclosing the output end 110b. The hood 150 is in contact with the loading platform 120, such that the volume above the output end 110b is enclosed by the hood 150. The sealing connection between the hood 150 and the loading platform 120 and the sealing connection between the loading platform 120 and the circumferential outer surface of the support body 110 enable a vacuum to be applied to the output end 110b via the hood 150 connected to a vacuum pump 152. By pressure balance and due to the connection via the internal channels of the support body 110, slurry 142 is drawn into the support body 110 via the open input end 110a. For example, in some embodiments, the slurry 142 is drawn through the inner opening of the ring-shaped sealing element 130 as well as through the complete cross-section of the input end 110a of the catalyst support body. In this way, an amount of the slurry 142 located in the pan 140 is drawn into the support body thereby coating inner surfaces of the catalyst support body 110 (e.g., internal channels). However, during this step of directing an amount of slurry 142 into the inside of the catalyst support body 110, no slurry is transferred to the circumferential outer surface of the support body 110, since the sealing element 130 blocks the slurry 142 at the circumference of the input end 110a. In this way, an amount of slurry is directed into the inside of the catalyst support body without soiling the outer circumferential surface of the catalyst support body 110. For example, in some embodiments, even the section of the circumferential outer surface of the support body 110 located below the surface of the slurry in the pan 140, i.e., the lower section of the catalyst support body 110 being immersed within the slurry, does not contact the slurry since the sealing element 130 provides a cover protection for the outer circumferential surface during the immersion for the input end 110a into the slurry.

In some embodiments, after having completed the step of directing an amount of slurry 142 into the support body 110, the vacuum provided by pump 152 is terminated, the hood 150 is released by lifting the hood from the loading platform 120, similar to the depiction of FIG. 4C. Then, the pan 140 is lowered as shown in FIG. 4B. Subsequently, the sealing element 130 is removed from the circumference of the input end 110a by lowering the sealing element 130. It can be seen from FIGS. 4A-4D that, in some embodiments, the pan 140 is lifted and lowered by a distance greater than the distance by which the sealing element 130 is lifted and lowered. This ensures that the sealing element 130 is in contact with the slurry only if necessary, i.e., in the case that the input end 110a is immersed into the slurry 142 as shown in FIG. 4D. In addition, this ensures that lowering the sealing element 130 does not lead to contact between the sealing element 130 and the slurry 142. The translational movement (lowering and lifting) of the sealing element 130 can be carried out overlappingly or during the movement (lowering or lifting) of the pan 140 if it is provided that the input end 110a contacts the slurry only and the sealing element 130 covers the circumference of the input end 110a.

In some embodiments, the pan 140 can be fixedly positioned and the loading platform 120 lowers and lifts the support body 110 as shown in FIGS. 4A-4D. In such an embodiment, the lifting mechanism of the sealing element 130 can be active or passive.

For example, in some embodiments, the lifting mechanism moving the sealing element can be a passive mechanism comprising springs which urge the sealing element 130 towards the support body 110. In some embodiments, the support body is lowered towards the pan 140 and contacts the sealing element 130. After having contacted the sealing element 130, the circumference of the input end 10a, i.e., the circumferential edge of the input end of the support body, stays in contact with the sealing element 130 while the force urging the sealing element towards the support body 110 maintains the contact between sealing element 130 and the circumference of the input end 110a. Upon continuation of the lowering process, the sealing element 130, together with the input end 110a, are immersed into the slurry 142, while the spring force exerted on the sealing element 130 ensures that the sealing element covers the circumference of the input end of the support body during the complete immersion process.

FIGS. 5A-5D depict an exemplary manufacturing device 400 for radial coating using a cover and sealing mechanism (cover assembly) 460 that is configured to enable the radial coating. The exemplary arrangement shown is configured for inter-coating of the support body 410 (e.g., coating an inner portion of a radial face, such as a circle, that axially extends along a length of the support body 410). The exemplary device 400 comprises a cover 462 and a plurality of spring-mounted rods 464 (spring 464a, rod 464b). In some embodiments, two spring-mounted rods 464 are provided; however, the number and placement of the rods 464 can vary to suit a particular application. The cover 462 includes a sealing surface 466 configured to prevent contact between a slurry 442 and a portion of catalyst support 410, such as an outer surface 410c and an outer ring 410d of a radial face of the support body 410. The spring-mounted rods 464 are connected to the cover 462 and slurry pan 440. In some embodiments, the spring-mounted rods 464 are releasable coupled to the pan 440 or adjacent support structure or platform to interchangeably couple various cover assemblies to the coating station. The springs 464a provide a force to the sealing surface 466 to seal the surface to the support body 410.

Figures 5A, 5B, 5C, 5D:
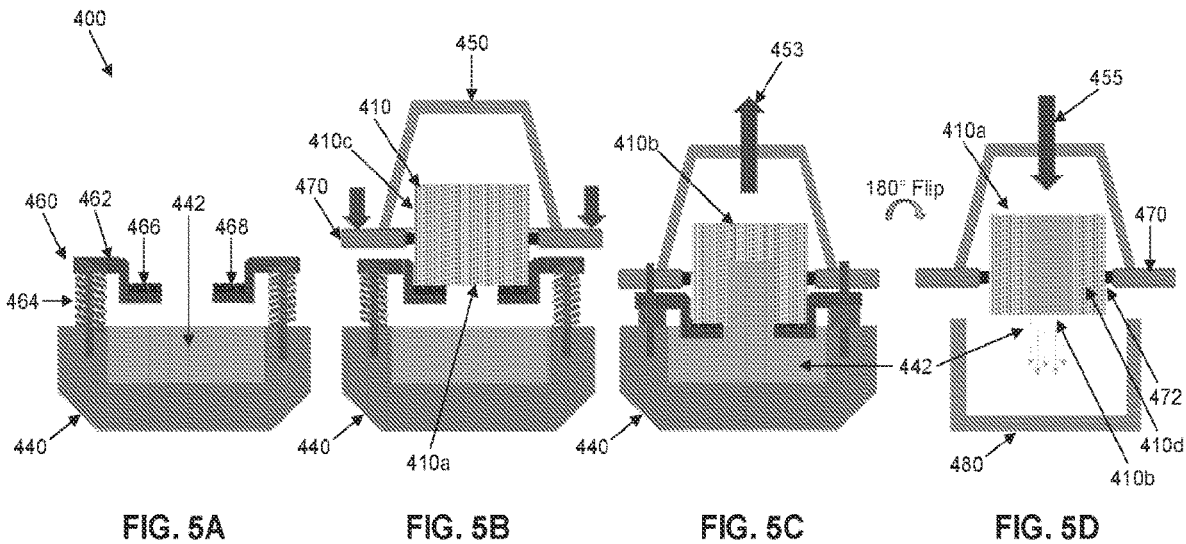
FIGS. 5A-5D are schematic representations of a device for coating a catalyst support body during various stages of the process in accordance with one or more embodiments of the present disclosure.

FIG. 5A depicts the exemplary device 400 mounted to the slurry pan 440 on a conventional coating machine (e.g., a MCC4-type coater); however, this arrangement can be incorporated into a novel coating station as disclosed herein. As shown, one end of the rods 464b are attached to the slurry pan 440 (e.g., via a threaded engagement or other mechanical fasteners), while the other ends are attached to the cover 462, with the springs 464a sandwiched therebetween. The rods 464b can be releasably or permanently attached to the cover 462 to suit a particular application. In some embodiments, the rods are slidably coupled to the cover to enable movement therebetween. The cover 462 shown has a recessed portion defining a centrally located opening and provides a sealing surface 466 for the support body 410. In the exemplary embodiment shown, the recess and sealing surface 466 are configured to seal about a circumference of the support body 410 and a portion of the face 410a thereof. However, the exact size and shape of the cover, recess, and sealing surface will vary to suit a particular application (e.g., the cross-sectional shape of the support body, the portion of the body to be coated, etc.).

In some embodiments, the sealing surface 466 comprises a first portion (e.g., a lip section), which can be in the form of a frustum, such as, for example, a truncated cone or similar tapered structure with a decreasing wall thickness along a direction corresponding to the tapering direction of the truncated cone. In some embodiments, the sealing surface 466 further comprises a second portion comprising an outer face extending along a plane from which the truncated cone arises and corresponds to a portion of the radial face of the catalyst support body. In some embodiments, the first portion is adapted for receiving the circumference, i.e., the circumferential edge, of the input end of the catalyst support body, and the second portion is adapted for attachment to the cover 462 and for contacting a specific portion of the radial face of the catalyst support body (e.g., an outer ring thereof).

FIG. 5B depicts the catalyst support body 410 being transported to the device via a holding clamp (or other type of loading platform) 470 and inserted into the cover assembly 460 and into contact with the sealing surface 466. In some embodiments, the clamp/platform 470 is capable of movement in three-dimensions (x, y, z) so as to enable introducing the support body 410 to the coating station, lowering and raising the body relative to the slurry, and removing the body to another station. In some embodiments, the loading platform 470 comprises a hood 450 that can be configured to seal one end of the support body 410 to enable application of a differential pressure across the support body 410. In some embodiments, the hood 450 can be a separate component brought into contact with the platform 470, support body 410, and/or cover assembly 460.

FIG. 5C depicts the catalyst support body 410 being pushed down via the movement of the hood 450 to compress the body 410 against the sealing surface 466 of the cover assembly 460. Alternatively, in some embodiments, the slurry pan 440 can be raised to bring the slurry into contact with the body 410, or a combination of both. The physical coverage and the sealing from the pressure between the catalyst support body 410 and the sealing surface 466 prevents any contact between the slurry 442 and the designated portions of the catalyst support body 410 (e.g., the outer surface 410c). Once sealed, the slurry 442 can be charged to the desired portion of the catalyst support body 410 by, for example, application of a vacuum 453 to the hood 450, and by extension, to an interior region of the support body 410.

FIG. 5D depicts the slurry-containing catalyst support body 410 having been flipped about 180° and then transferred to another coating station, where the excess slurry 442 can be pushed into another pan 480. As shown, inlet face 410a is now located at the top, while the outlet face 410b is now located at the bottom. In some embodiments, a positive pressure 455 (e.g., a blast of air) can then be applied to the hood to push the slurry 452 along the catalyst support body 410. In some embodiments, radial coating with a given zone length or full length can be achieved by the control of various coating parameters, such as, for example, the composition of the catalyst slurry and/or the configuration of the sealing surface 466. Generally, it is of little consequence to the catalyst function if the sealing surface 466 were to become inadvertently contaminated with slurry 452, as this will only affect the first millimeter or so of the entire channel length. This would represent an insignificant amount of material to affect overall catalyst function.

In the exemplary embodiment shown, the clamp or loading platform 470 comprises a rotary mechanism 472, such as, for example, an electric motor or pneumatically controlled actuator along with any necessary couplings, bearings, gears, etc., to rotate the support body 410 about 180 degrees. In some embodiments, the hood is removed prior to rotation and then reattached to allow for the introduction of the air blast 453. In some embodiments, the coating stations described herein can be provided according to or in combination with processing stations described in U.S. Pat. No. 9,186,662, the entire disclosure of which is hereby incorporated by reference herein. In some embodiments, the loading platform 470 is supported by a rotary or pivoting mechanism 472 for turning the support body (and, optionally, the loading platform) upside down. In some embodiments, this mechanism 472 can be synchronized with another pivoting mechanism for pivoting the hood 450. In this way, the hood can follow the pivoting movement when the support body is turned upside down and the hood has not been completely released from the support body. Examples of such mechanisms are described in U.S. Pat. No. 9,186, 662.

Figures 6A, 6B, 6C, 6D:
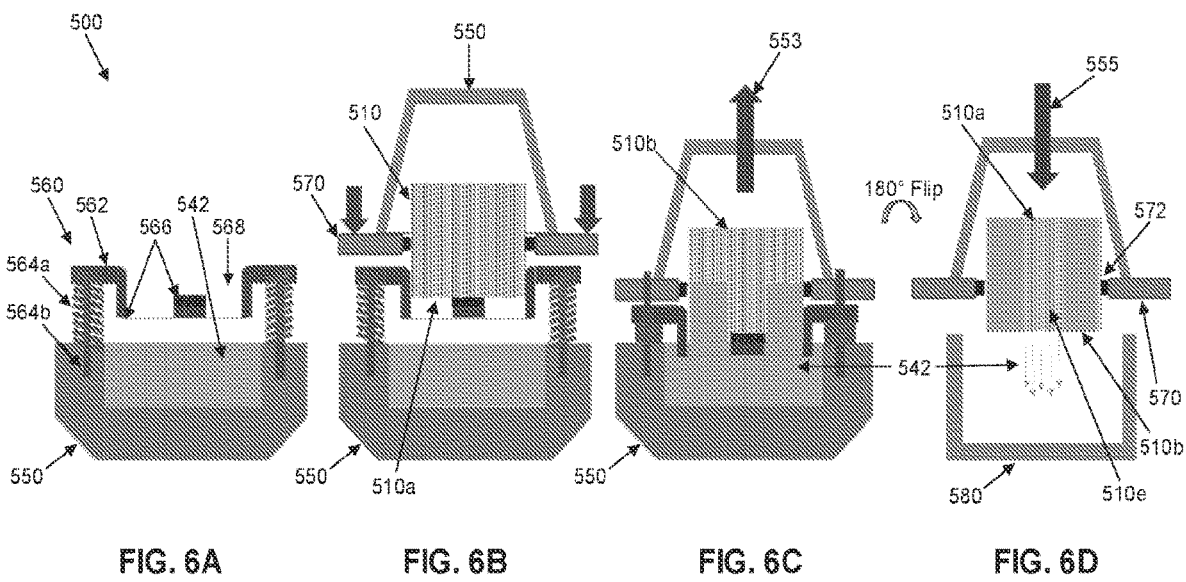
FIGS. 6A-6D are schematic representations of a device for coating a catalyst support body during various stages of the process in accordance with one or more embodiments of the present disclosure.
Figures 7A, 7B, 7C, 7D:
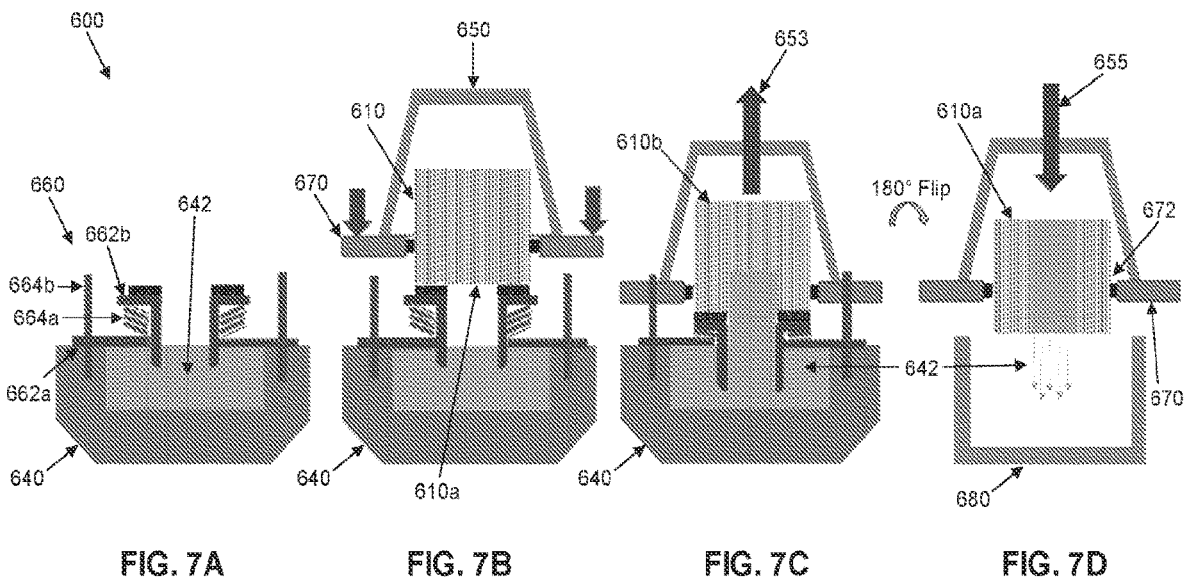
FIGS. 7A-7D are schematic representations of a device for coating a catalyst support body during various stages of the process in accordance with one or more embodiments of the present disclosure.
Figures 8A, 8B, 8C, 8D:
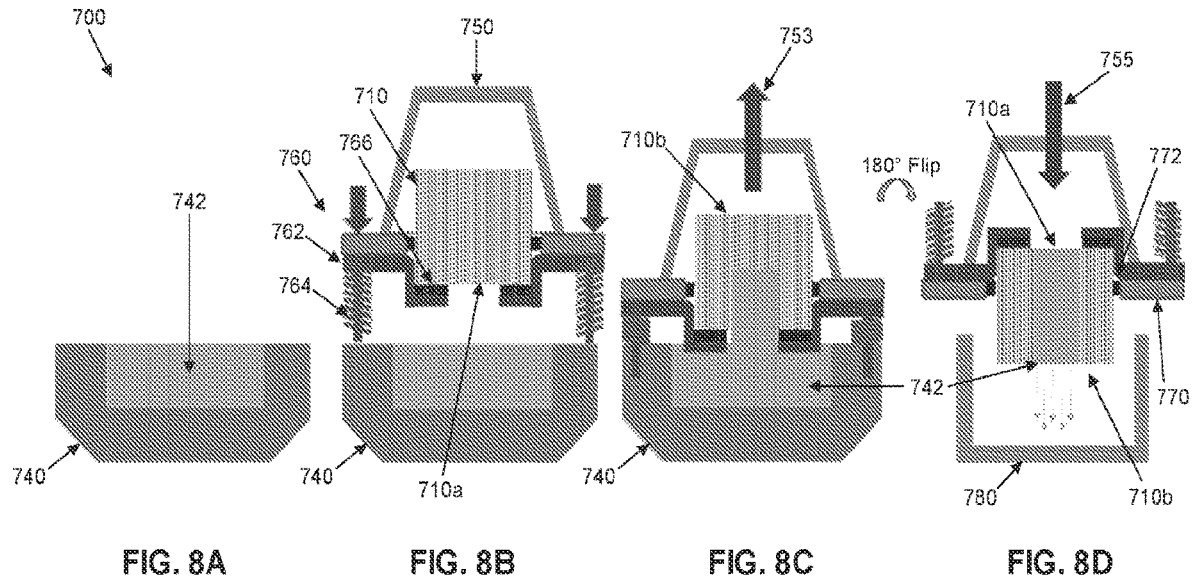
FIGS. 8A-8D are schematic representations of a device for coating a catalyst support body during various stages of the process in accordance with one or more embodiments of the present disclosure.
Figures 9A, 9B, 9C, 9D:
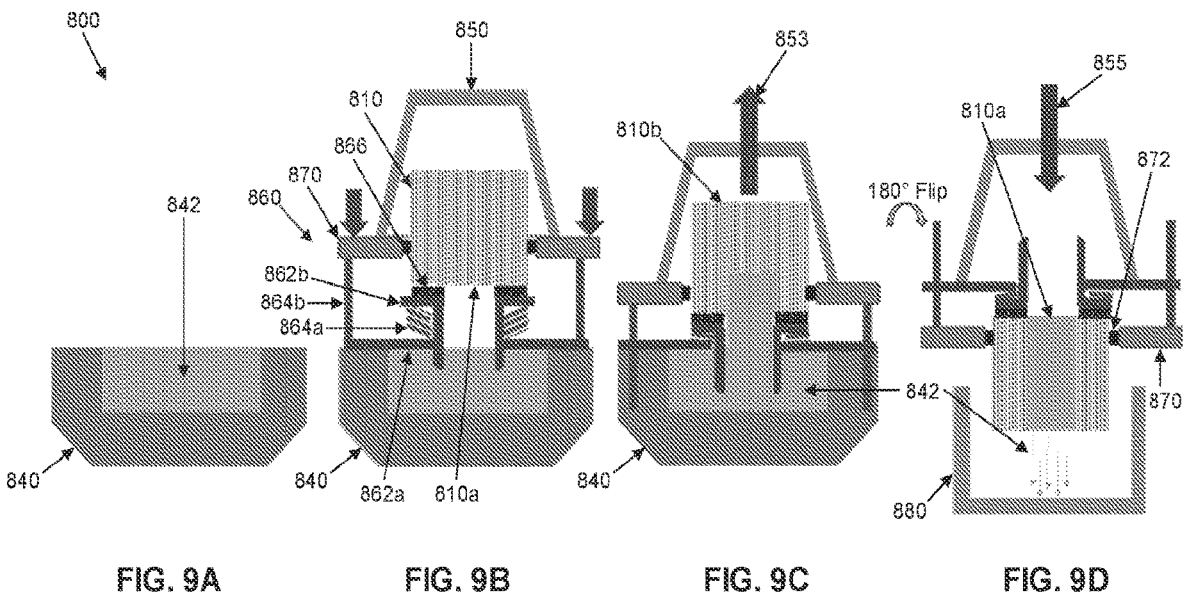
FIGS. 9A-9D are schematic representations of a device for coating a catalyst support body during various stages of the process in accordance with one or more embodiments of the present disclosure.

FIGS. 6A-6D depict an exemplary device 500 according to one or more embodiments of the present disclosure where the cover assembly 560 is configured to enable an outer-ring of the radial face of the catalyst support body to be coated (i.e., outer-coating). Generally, the usage of the exemplary device 500 in FIGS. 6A-6C will be similar to that of the exemplary device 400 described with respect to FIGS. 5A-5D. As can be seen in FIG. 6A, the cover 462 has a different configuration, where a portion of the sealing surface 566 is located where the centrally located opening in FIG. 5A was and another portion of the sealing surface 466 is located at the outer perimeter of the recess 568 so as to engage the support body 510.

As can be seen, the clamp/platform 570 introduces the support body 510 to the cover assembly 560 (FIG. 6B) and pushes the body 510 against the sealing surface 566 and into the slurry 542 where it can be charged (FIG. 6C). The support body 510 can then be flipped 180 degrees and transferred to another coating station, where the excess slurry can be recovered (FIG. 6D). In some embodiments, the exemplary devices 400, 500 can be interchangeably coupled to the same pan 442 (either with the same or different slurry compositions) to coat different radial zones of the support body 410, 510.

FIGS. 7A-7D depict another exemplary device 600 according to one or more embodiments of the present disclosure. In this exemplary embodiment, the cover assembly has been reconfigured so that the cover 662 comprises two pieces: a base 662a for attachment to the slurry pan 642 and a spring-mounted and slidably engaged carrier 662b that provides the sealing surface 666. The rods 664b couple the cover 662 to the pan 642, while the springs 664a are now located about the carrier portion of the cover 662b and provide the sealing force to the support body 610 once it has been introduced to the device 600. The cover 662 shown is for an inter-coating process; however, the cover 662 can be reconfigured to enable an outer-coating process. The remainder of the operation is substantially similar to that described above.

FIGS. 8A-8D (inter-coating) and 9A-9D (outer-coating) depict other exemplary embodiments of devices 400, 500, where the cover assemblies 760, 860 are configured for attachment to the loading platform 770, 870, as opposed to the slurry pans 740, 840. Generally, the usage of devices 700, 800 will be similar to that of the other devices described above.

As shown in FIGS. 8A-8D, the cover assembly 760 is now coupled to the loading platform 770 via the spring mounted rods 764, which may be, e.g., threadedly engaged with the platform 770. In some embodiments, the slurry pan 740 can include clearance holes disposed in a top surface thereof for aligning with the rods 764b. In some embodiments, the spring 764a can be coupled to the rod or the platform to maintain the integrity of the spring-mounted rod assembly 764.

As shown in FIGS. 9A-9D, the cover assembly 860 is similar to that described with respect to FIGS. 7A-7D and is now coupled to the loading platform 870 via the rods 864b. In some embodiments, the cover base 862a is slidably coupled to the rods 864b, which are fixedly coupled to the platform 870, with the cover carrier 862b slidably coupled to the cover base 862a as described with respect to FIGS. 7A-7D.

The materials selected for the different components of exemplary devices 400, 500, 600, 700, and 800 will vary to suit a particular application. For example, in some embodiments, the cover may be made from stainless steel, aluminum, or other slurry compatible materials, either metallic or polymeric. In some embodiments, the seals can be made from rubber or other slurry compatible elastomeric materials. In some embodiments, the seals or sealing surfaces can be coupled to the cover via adhesive, mechanical fasteners, or an interference or similar fit.

According to one or more embodiments of the present disclosure, the catalyst support body may be constructed of any material typically used for preparing automotive catalysts and may comprise, for example, a metal or ceramic honeycomb structure. The substrate typically provides a plurality of wall surfaces upon which the wash-coat composition is applied and adhered, thereby acting as a substrate for the catalyst composition.

Ceramic catalyst support bodies may be made of any suitable refractory material, such as, e.g., cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and the like.

Metallic catalyst support bodies can be made of one or more metals or metal alloys. A metallic catalyst support body may include any metallic substrate, such as those with openings or "punch-outs" in the channel walls. Examples of metallic substrate materials include heat-resistant, base-metal alloys, such as those in which iron is a substantial or major component. Such alloys may contain one or more of nickel, chromium, and aluminum, and the total of these metals may comprise at least about 15 wt % (weight percent) of the alloy, such as, for example, about 10 to about 25 wt % chromium, about 1 to about 8 wt % of aluminum, and from 0 to about 20 wt % of nickel, in each case based on the weight of the substrate. Examples of metallic catalyst support bodies include those having straight channels; those having protruding blades along the axial channels to disrupt gas flow and to open communication of gas flow between channels; and those having blades and also holes to enhance gas transport between channels allowing for radial gas transport throughout the monolith. Metallic catalyst support bodies, for example, are advantageously employed in certain embodiments, such as in a close-coupled position, allowing for fast heat-up of the body and, correspondingly, fast heat up of a catalyst composition coated therein.

In describing the quantity of wash-coat or catalytic metal components or other components of the composition, it is convenient to use units of weight of component per unit volume of catalyst substrate. Therefore, the units, grams per cubic inch ("g/in³") and grams per cubic foot ("g/ft³"), are used herein to mean the weight of a component per volume of the substrate, including the volume of void spaces of the substrate. Other units of weight per volume such as g/L are also sometimes used. In some embodiments, the total loading of the catalyst composition (including catalytic metal and support material) on the catalyst substrate, such as, for example, a monolithic flow-through substrate, ranges from about 0.5 to about 6 g/in³, such as, for example, from about 1 to about 5 g/in³. In some embodiments, the total loading of the PGM or base metal component without support material is in the range of about 0.5 to about 200 g/ft³ (e.g., about 10 to about 100 g/ft³). It is noted that these weights per unit volume are typically calculated by weighing the catalyst substrate before and after treatment with the catalyst wash-coat composition, and since the treatment process involves drying and calcining the catalyst substrate at high temperature, these weights represent an essentially solvent-free catalyst coating as essentially all of the water of the wash-coat slurry has been removed.

A catalyst and/or sorbent composition as described herein may comprise one or more supports or "carriers" such as refractory inorganic solid oxide porous powders including functionally active species.

Catalyst and/or sorbent compositions may be prepared using a binder, for example, a ZrO₂ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., such as, for example, about 800° C. and higher and high water vapor environments of about 5% or more. Other suitable binders include, but are not limited to, alumina and silica. Alumina binders include aluminum oxides, aluminum hydroxides and aluminum oxyhydroxides. Aluminum salts and colloidal forms of alumina may also be used. Silica binders include various forms of SiO₂, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total wash-coat loading. Alternatively, the binder can be zirconia-based or silica-based, for example zirconium acetate, zirconia sol or silica sol. When present, the alumina binder is typically used in an amount of about 0.05 g/in³ to about 1 g/in³.

In some embodiments, the catalytic articles described herein comprise at least a first oxidation catalyst composition and a second oxidation catalyst composition. Generally, an oxidation catalyst composition (also referred to herein as a "diesel oxidation catalyst (DOC) composition") comprises a platinum group metal (PGM) component dispersed on a support, such as a refractory metal support. Oxidation catalyst compositions are useful in treating the exhaust of diesel engines in order to convert both hydrocarbon (HC) and carbon monoxide (CO) gaseous pollutants by catalyzing the oxidation of these pollutants to carbon dioxide and water.

In some embodiments, the oxidation catalyst composition comprises a catalytically active PGM component and a metal selected from alkali metals, alkaline earth metals, and combinations thereof. PGM components useful in the disclosed DOC compositions include any component that includes a PGM. In some embodiments, the PGM component comprises one or more platinum group metals chosen from platinum, palladium, ruthenium, rhodium, osmium, iridium, gold, and combinations thereof (i.e., Pt, Pd. Ru, Rh, Os, Ir, Au, and combinations thereof). In some embodiments, the PGM may be in metallic form, with zero valence, or the PGM may be in an oxide form. The PGM component can include one or more PGMs in any valence state. Hence, the terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, such as, for example, the metal or the metal oxide. In some embodiments, the PGM component is a metal or an oxide thereof (e.g., including, but not limited to, platinum or an oxide thereof).

In some embodiments, the oxidation catalyst composition comprises the PGM component in an amount ranging from about 0.1 wt % (weight percent), about 0.5 wt %, about 1.0 wt %, about 1.5 wt %, or about 2 wt % to about 3 wt %, about 5 wt %, about 7 wt %, about 9 wt %, about 10 wt % about 12 wt %, about 15 wt %, about 16 wt %, about 17 wt %, about 18 wt %, about 19 wt %, or about 20 wt %, based on the total weight of the oxidation catalyst composition.

In some embodiments, the oxidation catalyst composition further comprises a metal component chosen from alkali metals, alkaline earth metals, and combinations thereof. In some embodiments, the alkali metal may be selected from one or more of lithium, sodium, potassium, rubidium, or cesium. In some embodiments, the alkaline earth metal may be selected from one or more of magnesium, calcium, strontium, or barium. In some embodiments, the alkali metal comprises lithium, sodium, potassium, rubidium, cesium, or combinations thereof. In some embodiments, the alkali metal is sodium. In some embodiments, the alkali metal is lithium. In some embodiments, the alkali metal is potassium. In some embodiments, the alkali metal is rubidium. In some embodiments, the alkali metal is cesium. In some embodiments, the alkali metal is a combination of sodium and one or more of lithium, potassium, rubidium, and cesium.

In some embodiments, the alkaline earth metal comprises magnesium, calcium, strontium, barium, or combinations thereof. In some embodiments, the alkaline earth metal is magnesium. In some embodiments, the alkaline earth metal is calcium. In some embodiments, the alkaline earth metal is strontium. In some embodiments, the alkaline earth metal is barium.

In some embodiments, the oxidation catalyst composition comprises the metal component chosen from alkali metals, alkaline earth metals, and combinations thereof in an amount of from about 0.1 wt %, about 0.3 wt %, about 0.5 wt %, or about 1.0 wt % to about 1.5 wt %, about 2.0 wt %, about 2.5 wt %, about 3.0 wt %, about 3.5 wt %, or about 4.0 wt %, based on the total weight of the oxidation catalyst composition.

In some embodiments, the oxidation catalyst compositions may optionally further comprise one or more additional catalytically active metals chosen from copper, iron, chromium, manganese, cobalt, nickel, and combinations thereof. In some embodiments, the additional catalytically active metal is manganese.

In some embodiments, the PGM component of the oxidation catalyst composition is supported on a support material. The PGM component can be, for example, supported on a refractory metal oxide and/or on a molecular sieve.

In some embodiments, the support material on which the catalytically active PGM component is supported comprises a refractory metal oxide, which exhibits chemical and physical stability at high temperatures, such as the temperatures associated with gasoline or diesel engine exhaust. Exemplary refractory metal oxides include alumina, silica, zirconia, titania, ceria, praseodymia, tin oxide, and the like, as well as physical mixtures or chemical combinations thereof, including atomically-doped combinations and including high surface area or activated compounds such as activated alumina.

High surface area refractory metal oxides that may be suitable for use to support the PGM component include alumina, titania, and zirconia; mixtures of alumina with one or more of titania, zirconia, and ceria; and ceria coated on alumina or titania coated on alumina. The refractory metal oxide may contain an oxide or a mixed oxide such as silica-alumina, aluminosilicates, which may be amorphous or crystalline, alumina-zirconia, alumina-chromia, alumina-ceria, and the like. In some embodiments, the refractory metal oxide is chosen from gamma alumina, silica-alumina, ceria coated on alumina, titania coated on alumina, zirconia coated on alumina, and combinations thereof. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia alumina and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 m$^2$/g, often up to about 200 m$^2$/g or higher. An exemplary refractory metal oxide comprises high surface area γ-alumina having a specific surface area of about 50 to about 300 m$^2$/g. Such activated alumina is usually a mixture of the gamma and delta phases of alumina, but may also contain substantial amounts of eta, kappa, and theta alumina phases. "BET surface area" has its usual meaning of referring to the Brunauer-Emmett-Teller method for determining surface area by N$_2$ adsorption measurements. Unless otherwise stated, "surface area" refers to BET surface area. In some embodiments, the activated alumina has a specific surface area of about 60 to about 350 m$^2$/g, such as, for example, from about 90 to about 250 m$^2$/g.

In some embodiments, refractory metal oxide supports useful in the oxidation catalyst compositions disclosed herein are doped alumina materials, such as Si-doped alumina materials (including, but not limited to, 1-10 wt. % SiO$_2$-doped Al$_2$O$_3$), doped titania materials, such as Si-doped titania materials (including, but not limited to, 1-10 wt. % SiO$_2$-doped TiO$_2$), or doped zirconia materials, such as Si-doped ZrO$_2$ (including, but not limited to, 5-30 wt. % SiO$_2$-doped ZrO$_2$). For example, in some embodiments, the metal oxide support is 1 wt % SiO$_2$-doped Al$_2$O$_3$ or 8-14 wt. % SiO$_2$-doped TiO$_2$.

In some embodiments, the refractory metal oxide support may be doped with one or more additional basic metal oxide materials such as lanthanum, barium, praseodymium, neodymium, samarium, strontium, calcium, magnesium, niobium, hafnium, gadolinium, terbium, dysprosium, erbium, ytterbium, tin, zinc, or combinations thereof. In some embodiments, the metal oxide dopant may be selected from lanthanum oxide, barium oxide, strontium oxide, calcium oxide, magnesium oxide, and combinations thereof. In some embodiments, the metal oxide dopant is present in an amount of about 1 to about 20% by weight, based on the total weight of the oxidation catalyst composition. The dopant oxide materials, without wishing to be bound by theory, may serve to improve the high temperature stability of the refractory metal oxide support or function as a sorbent for acidic gases such as NO$_2$, SO$_2$, and/or SO$_3$.

The dopant metal oxides can be introduced, for example, using an incipient wetness impregnation technique or through use of colloidal mixed oxide particles. In some embodiments, the dopant metal oxide is chosen from colloidal baria-alumina, baria-zirconia, baria-titania, zirconia-alumina, baria-zirconia-alumina, lanthana-zirconia, mixtures thereof, and the like. In some embodiments, the refractory metal oxides or refractory mixed metal oxides in the oxidation catalyst composition are chosen from alumina, zirconia, silica, titania, ceria, and mixtures thereof, such as, for example, bulk ceria, manganese oxide, zirconia-alumina, ceria-zirconia, ceria-alumina, lanthana-alumina, baria-alumina, silica, silica-alumina, and combinations thereof. These refractory metal oxides may be further doped with base metal oxides such as baria-alumina, baria-zirconia, baria-titania, zirconia-alumina, baria-zirconia-alumina, lanthana-zirconia and the like. In some embodiments, the oxidation catalyst composition may comprise ceria, alumina, and zirconia or doped compositions thereof.

The oxidation catalyst composition may comprise any of the above-named refractory metal oxides in any amount. For example, the refractory metal oxides may be present in the oxidation catalyst composition in an amount ranging from about 15 wt %, about 20 wt %, about 25 wt %, about 30 wt %, or about 35 wt % to about 50 wt %, about 55 wt %, about 60 wt %, about 65 wt %, or about 70 wt % based on the total dry weight of the oxidation catalyst composition. The oxidation catalyst composition may, for example, comprise from about 10 to about 99 wt % alumina, from about 15 to about 95 wt % alumina, or from about 20 to about 85 wt % alumina.

The PGM component may be dispersed on the refractory metal oxide support by, for example, dispersing a soluble precursor (e.g., palladium nitrate) thereon. Alternatively, the PGM component may be provided in particulate form in the composition, such as in the form of fine particles as small as 1 to 15 nanometers in diameter or smaller, as opposed to being dispersed on the support.

In some embodiments, the oxidation catalyst composition may further comprise one or more hydrocarbon (HC) storage components for the adsorption of hydrocarbons. Any known HC storage material can be used, e.g., a microporous material such as a zeolite or zeolite-like material. In some embodiments, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, a beta zeolite, or mixtures thereof. In some embodiments, the zeolite adsorbent material has a high silica to alumina ratio, such as, for example, a silica to alumina molar ratio of at least about 25:1 or at least about 50:1. In some embodiments, the silica to alumina molar ratio ranges from about 25:1 to about 1000:1, from about 50:1 to about 500:1, or from about 25:1 to about 300:1. Preferred zeolites include ZSM-5, Y, and beta zeolites. A particularly preferred adsorbent may comprise a beta zeolite of the type disclosed in U.S. Pat. No. 6,171,556, which is incorporated herein by reference in its entirety. When present, zeolites or other HC storage components are typically used in an amount of about 0.05 g/in$^3$ to about 1 g/in$^3$.

In some embodiments, the catalytic articles described herein comprise a first oxidation catalyst composition coating at least a portion of each passageway of a first oxidation region of the substrate. In some embodiments, the first oxidation catalyst composition is configured to provide relatively high oxidation activity. In some embodiments, the first oxidation catalyst composition comprises at least one platinum group metal (PGM) component and a first support material on which the at least one PGM component is supported. In some embodiments, the first oxidation catalyst composition comprises platinum. In some embodiments, the first oxidation catalyst composition comprises platinum and palladium. In some embodiments, the weight ratio of Pt:Pd in the first oxidation catalyst composition ranges from about 1:0 to about 1:1, such as, for example, from about 4:1 to about 2:1. In some embodiments, the total amount of PGM in the first oxidation catalyst composition ranges from about 0.5 to about 200 g/ft$^3$, such as, for example, from about 5-150 g/ft$^3$, or from about 10-100 g/ft$^3$.

In some embodiments, the catalytic articles described herein further comprise a second oxidation catalyst composition coating at least a portion of each passageway of a second oxidation region of the substrate. In some embodiments, the second oxidation catalyst composition is configured to provide lower oxidation activity than the first oxidation catalyst composition, such that the second oxidation region of the substrate provides lower oxidation activity than the first oxidation region of the substrate. In some embodiments, the second catalyst composition comprises at least one platinum group metal (PGM) component and a second support material on which the at least one PGM component is supported. In some embodiments, the second oxidation catalyst composition comprises platinum and palladium. In some embodiments, the second oxidation catalyst composition is substantially free of platinum. In some embodiments, the weight ratio of Pt:Pd in the second catalyst composition ranges from about 0:1 to about 4:1, such as, for example, from about 0:1 to about 1:1, or from about 0:1 to about 1:4. In some embodiments, the total amount of PGM in the second oxidation catalyst composition ranges from about 0.5 to about 200 g/ft$^3$, such as, for example, from about 5-150 g/ft$^3$, or from about 10-60 g/ft$^3$. In some embodiments, the amount of platinum in the first oxidation catalyst composition, measured in g/ft$^3$, is greater than the amount of platinum in the second oxidation catalyst composition. In some embodiments, the weight ratio of Pt:Pd in the first oxidation catalyst composition is greater than the weight ratio of Pt:Pd in the second oxidation catalyst composition.

In some embodiments, preparing the oxidation catalyst composition comprises impregnating the porous support (e.g., a refractory oxide support material in particulate form, such as, for example, particulate alumina) with a PGM or base metal solution. Multiple metal components (e.g., platinum and palladium) can be impregnated at the same time or separately and can be impregnated on the same support particles or separate support particles using an incipient wetness technique. The support particles are typically dry enough to absorb substantially all of the solution to form a moist solid. Aqueous solutions of water soluble compounds or complexes of the metal component are typically utilized, such as palladium or platinum nitrate, tetra-ammine palladium or platinum nitrate, tetra-ammine palladium or platinum acetate, copper (II) nitrate, manganese (II) nitrate, and ceric ammonium nitrate. In certain embodiments, colloidal platinum can be used in embodiments of the catalyst compositions described herein. Following treatment of the support particles with the metal solution, the particles are dried, such as by heat treating the particles at elevated temperature (e.g., 100-150° C.) for a period of time (e.g., 1-3 hours), and then calcining to convert the metal components to a more catalytically active form. An exemplary calcination process involves heat treatment in air at a temperature of about 400-550° C. for 1-3 hours. The above process can be repeated as needed to reach the desired level of impregnation. The resulting material can be stored as a dry powder or in slurry form.

Figure 10:
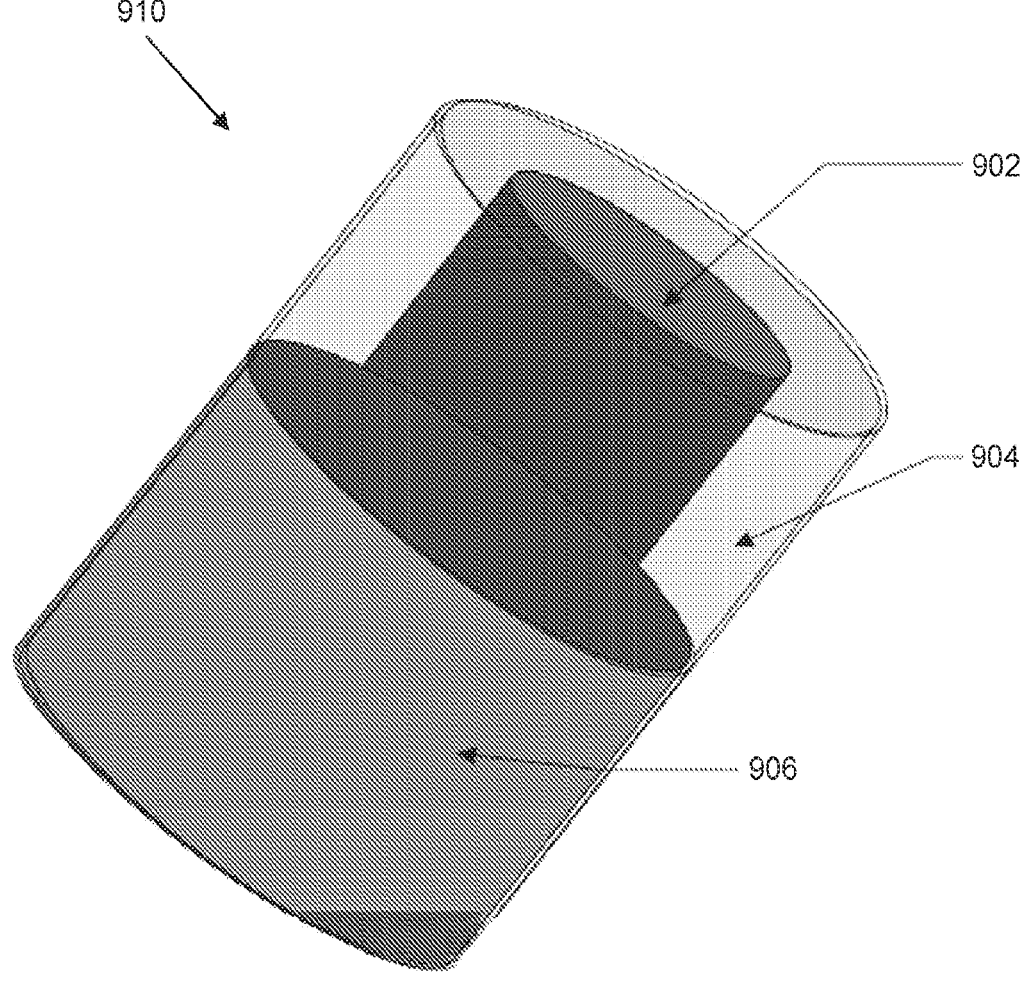
FIG. 10 is a perspective view of an exemplary catalyst support body coated in accordance with one or more embodiments of the present disclosure.

FIG. 10 depicts an exemplary catalyst support body 910 coated in accordance with the methods described herein. The body 910 includes multiple oxidation regions or zones that can be of any shape or size. In some embodiments, the first oxidation region comprises a circular center region and the second region comprises an annular outer region concentric to the first region; however, the regions are not limited to circular shapes or a concentric first center region and outer annular second region as generally shown in FIG. 10. Additionally, in some embodiments, the body 910 can include front and rear zones, such as, for example, a front radial zone 902, a front peripheral zone 904, and a rear zone 906. Furthermore, in some embodiments, one region can have a pie wedge shape or other irregular shape as accommodated by a cover assembly designed accordingly. The shape or configuration of the subsets of passageways defining various regions is also not meant to be limited. For example, regions can be configured as chords, semi-circles, or other shapes known in the art. The level of oxidation activity of a given region and the number of passageways within a first region as compared to a second region are factors that affect the overall oxidation activity of the catalytic article.

In some embodiments, the first region can comprise about 10-70, or about 30-60, or about 25-40 percent of the plurality of passageways in the substrate. In some embodiments, the second region can comprise about 30-90, or about 40-70, or about 60-75 percent of the plurality of passageways in the substrate. In some embodiments, the ratio of the number of passageways of the first region to the number of passageways of the second region can be in the range of about 10:90 to about 90:10, or about 20:80 to about 80:20, or about 30:70 to about 70:30. In some embodiments, the ratio of the surface area of the catalyst support body coated by the catalyst composition(s) in the first region to the surface area of the substrate coated by the catalyst composition(s) in the second region can be in the range of about 10:90 to about 90:10, or about 20:80 to about 80:20, or about 30:70 to about 70:30. The proportion of the substrate defined by each of the different oxidation regions can affect the $NO_2/NO_x$ ratio of the gases leaving the catalytic article.

At least a portion of each passageway of the subset of passageways defining each region can be coated with a catalyst composition. Different catalyst compositions can be used to coat each region of the catalyst support body. In some embodiments, the same catalyst composition can be applied as a catalyst coating layer to more than one region of the catalyst support body. In some embodiments, the entire axial length of each passageway. i.e., from the inlet end to the outlet end of the catalyst support body, can be coated with a catalyst composition. In some embodiments, only a portion of the axial length of each passageway can be coated with a catalyst composition. In some embodiments, the axial length of each passageway can be laterally zone-coated with two or more catalyst compositions. In some embodiments, one or more regions can be free of a catalyst coating and/or free of a PGM-based catalyst coating.

In some embodiments of the present disclosure, a first oxidation catalyst composition coats at least a portion of each passageway of a first region of the substrate. In some embodiments, the first catalyst composition is a high oxidation catalyst composition, meaning that exhaust gas contacting the first catalyst composition undergoes a high level of oxidation of the hydrocarbons and carbon monoxide present in the inlet gas stream. In some embodiments, the first catalyst composition can be positioned as a sole PGM-containing catalyst layer in each of the passageways in the first subset of passageways defining the first oxidation region, or a zoned portion thereof. In some embodiments, the first catalyst composition can be positioned as a top, bottom, or middle PGM-containing catalyst layer in each of the passageways in the first subset of passageways defining the first oxidation region, or a zoned portion thereof. The first catalyst composition is positioned such that exhaust gas flowing into the inlet side of the substrate in the first oxidation region comes in contact with the first catalyst composition.

In some embodiments, a second oxidation catalyst composition coats at least a portion of each passageway of a second region of the substrate. In some embodiments, the second catalyst composition is a low oxidation catalyst composition, as compared to the first oxidation catalyst composition in terms of oxidation activity. In some embodiments, the second catalyst composition can be positioned in the second oxidation region as a sole PGM-containing catalyst layer in each of the passageways in the second subset of passageways defining the second oxidation region, or a zoned portion thereof. In some embodiments, the second catalyst composition can be positioned as a top, bottom, or middle PGM-containing catalyst layer in each of the passageways in the second subset of passageways defining the second oxidation region, or a zoned portion thereof. The second catalyst composition is positioned such that exhaust gas flowing into the inlet side of the substrate in the second oxidation region comes in contact with the second catalyst composition.

In some embodiments of the present disclosure, the total weight ratio of Pt:Pd in the first oxidation region (i.e., high oxidation region) ranges from about 1:0 to about 1:1, such as, for example, from about 4:1 to about 2:1. The total amount of PGM in the first oxidation region can be about 0.5 to about 200 $g/ft^3$, about 5-150 $g/ft^3$, or about 10-10 g/ft. The total weight ratio of Pt:Pd in the second oxidation region (i.e., low oxidation region) can be about 0:1 to about 1:0, or about 0:1 to about 4:1. The total amount of PGM in the second oxidation region can be about 0.5 to about 200 $g/ft^3$, about 5-150 $g/ft^3$, or about 10-100 $g/ft^3$. The total weight ratio and total amounts are based on the total dry weights of the PGM in each region regardless of whether a sole catalyst composition or multiple catalyst compositions are applied to the passageways of each region.

Figure 2:
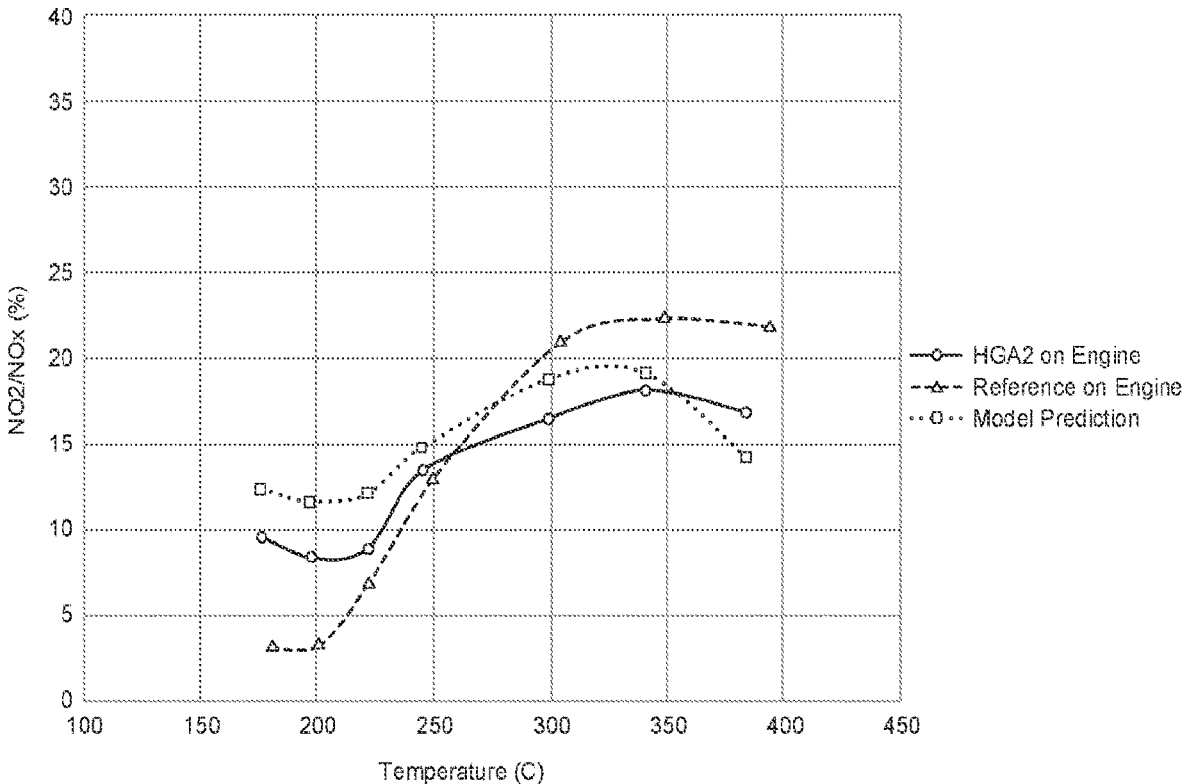
FIG. 2 is a graphical representation of the $NO_2:NO_x$ ratio out of a traditional and a radially coated diesel oxidation catalyst.

FIG. 2 shows the $NO_2:NO_x$ ratio at the DOC outlet from an engine test of DOCs with and without radially-zoned oxidation regions. For the traditional DOC design without radial-coating ("Reference on Engine"), the $NO_2:NO_x$ ratio rapidly lights off in the temperature range between 200° C. to 300° C. and then reaches the thermodynamic limit in the temperature range between 300° C. to 400° C. For the radially-coated design in accordance with some embodiments of the present disclosure ("HGA2 on Engine"), the $NO_2:NO_x$ ratio gradually increases in the temperature range between 200° C. to 300° C. without the steep light-off curve and stabilizes in the temperature range between 300° C. to 400° C.

In some embodiments, a catalytic article prepared according to the present disclosure can be provided in an exhaust gas treatment system, such as, for example, an exhaust gas treatment system for treating an exhaust gas stream from a diesel engine. In some embodiments, the exhaust gas treatment systems can further comprise one or more additional catalytic articles selected from a selective catalytic reduction (SCR) catalyst (e.g., a zeolite-based SCR catalyst), a soot filter, an ammonia oxidation (AMOx) catalyst, a lean-$NO_x$ trap (LNT), and combinations thereof.

EXAMPLE EMBODIMENTS

Without limitation, some embodiments according to the present disclosure include:

Embodiment 1. A method of coating a catalyst support body, the method comprising the steps of:

providing a catalyst slurry via a pan comprising:

a reservoir configured to receive the slurry;

a sealing cover configured to receive the catalyst support body; and a plurality of spring-loaded rods configured to couple the cover to the pan;

introducing the catalyst support body to the sealing cover;

introducing an open input end of the catalyst support body into the catalyst slurry;

directing an amount of the catalyst slurry through the input end and into an inner portion of the catalyst support body;

removing the catalyst support body from the catalyst slurry;

rotating the catalyst support body relative to the pan; and directing the catalyst slurry within the catalyst support body towards an open output end of the catalyst support body.

Embodiment 2. A method of coating a catalyst support body, the method comprising the steps of:

providing a catalyst slurry via a slurry pan;

coupling a sealing cover to the slurry pan via a plurality of spring-loaded rods, wherein the sealing cover is configured to receive the catalyst support body and seal at least a portion thereof;

introducing the catalyst support body to the sealing cover;

introducing an open input end of the catalyst support body into the catalyst slurry;

directing an amount of the catalyst slurry through the input end and into an inner portion of the catalyst support body;

removing the catalyst support body from the catalyst slurry;

rotating the catalyst support body relative to the pan; and directing the catalyst slurry within the catalyst support body towards an open output end of the catalyst support body.

Embodiment 3. A method of coating a catalyst support body, the method comprising the steps of:

coupling a sealing cover to a clamping mechanism configured to interface with the catalyst support body, wherein the sealing cover is configured to receive the catalyst support body and seal at least a portion thereof and comprises a plurality of spring-loaded rods configured to interface with a slurry pan;

introducing the catalyst support body to the sealing cover;

introducing an open input end of the catalyst support body into a catalyst slurry within the slurry pan;

directing an amount of the catalyst slurry through the input end and into an inner portion of the catalyst support body;

removing the catalyst support body from the catalyst slurry;

rotating the catalyst support body relative to the pan; and directing the catalyst slurry within the catalyst support body towards an open output end of the catalyst support body.

Embodiment 4. The method of any one of Embodiments 1-3, wherein the catalyst support body is rotated about 180 degrees relative to the pan.

Embodiment 5. The method of any one of Embodiments 1-4, wherein the cover comprises an impermeable sealing surface configured to seal against at least one of a face or a circumferential edge of the input end of the catalyst support body to prevent contact between an outer surface of the catalyst support body and the catalyst slurry.

Embodiment 6. The method of Embodiment 5, wherein the cover is further configured to prevent axial flow of the slurry through a radial portion of the face.

Embodiment 7. The method of Embodiment 6, wherein the cover is configured to prevent axial flow of the catalyst slurry through an outer ring area of the face.

Embodiment 8. The method of Embodiment 5, wherein an orientation of the cover is adjustable relative to the pan.

Embodiment 9. The method of any one of Embodiments 1-8, wherein the step of introducing the catalyst support body to the cover comprises transporting the catalyst support body via a clamping mechanism configured to press the catalyst support body in to the cover to create a seal therebetween.

Embodiment 10. The method of any one of Embodiments 1-9, wherein the step of introducing an open input end of the catalyst support body into the catalyst slurry comprises compressing the spring-loaded rods to provide a sealing force against the catalyst support body.

Embodiment 11. The method of any one of Embodiments 1-10, wherein the step of directing an amount of the catalyst slurry through the input end comprises applying a pressure difference between the input end of the catalyst support body and an output end of the catalyst support body.

Embodiment 12. The method of any one of Embodiments 1-11, wherein the step of removing the catalyst support body from the catalyst slurry includes separating the catalyst support body from the cover.

Embodiment 13. The method of any one of Embodiments 1-12, wherein the step of rotating the catalyst support body is carried out via a clamping mechanism secured to the catalyst support body via a rotary mechanism.

Embodiment 14. The method of any one of Embodiments 1-13, wherein the step of directing the catalyst slurry within the catalyst support body towards an open output end of the catalyst support body comprises directing a flow of air into the open input end.

Embodiment 15. The method of any one of Embodiments 1-14, further comprising the steps of:

introducing the catalyst support body to a second sealing cover configured to seal a different portion of the catalyst support body;

introducing either the open output end or the open input end of the catalyst support body into a second catalyst slurry;

directing an amount of the second catalyst slurry into a second inner portion of the catalyst support body;

removing the catalyst support body from the second catalyst slurry;

rotating the catalyst support body relative to the pan; and directing the catalyst slurry within the catalyst support body towards an open end of the catalyst support body.

Embodiment 16. A device for enabling radial coating of a catalyst support body with a coating station comprising a slurry pan and a clamping mechanism, the device comprising:

a sealing cover configured to releasably hold the catalyst support body and seal against a face or circumference of an input end of the catalyst support body to prevent contact between an outer surface of the catalyst support body and a catalyst slurry; and a plurality of spring-loaded rods configured to couple the sealing cover to the slurry pan.

Embodiment 17. A device for enabling radial coating of a catalyst support body with a coating station comprising a slurry pan and a clamping mechanism, the device comprising:

a sealing cover configured to seal against a face or circumference of an input end of the catalyst support body to prevent contact between an outer surface of the catalyst support body and a catalyst slurry; and a plurality of spring-loaded rods configured to interface with the slurry pan, wherein the sealing cover is configured to couple to a clamping mechanism configured to releasably hold the catalyst support body.

Embodiment 18. The device of Embodiment 16 or 17, wherein the sealing cover is configured to prevent axial flow of the slurry through a radial portion of the face of the catalyst support body.

Embodiment 19. The device of Embodiment 18, wherein the sealing cover is configured to prevent axial flow of the catalyst slurry through an outer ring area of the face.

Embodiment 20. The device of Embodiment 16 or 17, further comprising a rotary mechanism coupled to the clamping mechanism and configured to rotate the catalyst support body 180 degrees.

Embodiment 21. The device of Embodiment 20, further comprising an actuator coupled to the rotary mechanism and configured to drive the rotation of the catalyst support body.

Embodiment 22. A coating station for applying a catalyst composition to at least a portion of an inside surface area of a catalyst support body, the station comprising:

a platform comprising a slurry pan, in which a catalyst slurry can be located;

a clamping mechanism configured to releasably grasp the catalyst support body and provide relative motion thereto with respect to the slurry pan;

a sealing cover configured to seal against a face or circumference of an input end of the catalyst support body to prevent contact between an outer surface of the catalyst support body and a catalyst slurry; and a plurality of spring-loaded rods configured to interface with the slurry pan.

Embodiment 23. The coating station of Embodiment 22, wherein the sealing cover is further configured to prevent contact with a portion of the face and any axial passageways extending therefrom.

Embodiment 24. The coating station of Embodiment 22, wherein the sealing cover is configured to be releasably coupled to the clamping mechanism.

Embodiment 25. The coating station of Embodiment 22, further comprising a second sealing cover also configured to be releasably coupled to the clamping mechanism, wherein the sealing covers are interchangeable to provide different sealing configurations to the face of the catalyst support body.

Embodiment 26. The coating station of Embodiment 22, wherein the plurality of spring-loaded rods is configured to couple the sealing cover to the slurry pan.

Embodiment 27. The coating station of Embodiment 22, wherein the clamping mechanism is further configured to provide vertical movement to the catalyst support body so as to immerse an open end of the catalyst support body into the slurry pan and to also remove it therefrom.

Embodiment 28. The coating station of Embodiment 22, further comprising a rotary mechanism coupled to the clamping mechanism and configured to rotate the catalyst support body 180 degrees.

Embodiment 29. The coating station of Embodiment 28, further comprising an actuator coupled to the rotary mechanism and configured to drive the rotation of the catalyst support body.

Embodiment 30. The coating station of Embodiment 22, further comprising a movable hood configured to sealingly contact at least one of an upper open end of the catalyst support body, an upper surface of the clamping mechanism, or an upper surface of the platform to apply a pressure to a volume enclosed by the hood.

Embodiment 31. The coating station of Embodiment 22, further comprising:

a second platform comprising a second slurry pan, in which a second catalyst slurry can be located;

a second sealing cover configured to seal against a different portion of the face of the input end of the catalyst support body to prevent contact between the second catalyst slurry and both the outer surface of the catalyst support body and a portion of the face and any axial passageways extending therefrom.

Embodiment 32. The device of Embodiment 16 or 17, wherein the coating station is a conventional coating station.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto; the invention may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

The invention claimed is:

1. A method of coating a catalyst support body, the method comprising the steps of:

providing a catalyst slurry via a coating station that includes a slurry pan, a sealing cover, and a plurality of spring-loaded rods coupling the sealing cover to the slurry pan, comprising:

receiving the slurry in the slurry pan;

releasably holding, by the sealing cover, the catalyst support body, wherein the sealing cover comprises an impermeable sealing surface configured to seal;

a first sealing region against at least one of a face or a circumferential edge of the input end of the catalyst support body to prevent contact between an outer surface of the catalyst support body and the catalyst slurry; and a second sealing region distinct from the first sealing region; and introducing the catalyst support body to the sealing cover;

introducing an open input end of the catalyst support body into the catalyst slurry;

directing an amount of the catalyst slurry through the input end and into an inner portion of the catalyst support body;

removing the catalyst support body from the catalyst slurry;

rotating the catalyst support body relative to the slurry pan; and directing the catalyst slurry within the catalyst support body towards an open output end of the catalyst support body.

2. The method of claim 1, wherein the catalyst support body is rotated about 180 degrees relative to the slurry pan.

3. The method of claim 1, wherein the second sealing region comprises one or more of an annular ring, a wedge, or irregular shape to facilitate coating in specific regions within the catalyst support.

4. The method of claim 3, wherein the scaling cover is further configured to prevent axial flow of the slurry through a radial portion of the face, or the sealing cover is configured to prevent axial flow of the catalyst slurry through an outer ring area of the face.

5. The method of claim 1, wherein the step of introducing the catalyst support body to the sealing cover comprises transporting the catalyst support body via a clamping mechanism configured to press the catalyst support body into the sealing cover to create a seal therebetween.

6. The method of claim 1, wherein the step of introducing an open input end of the catalyst support body into the catalyst slurry comprises compressing the spring-loaded rods to provide a sealing force against the catalyst support body.

7. The method of claim 1, wherein the step of directing an amount of the catalyst slurry through the input end comprises applying a pressure difference between the input end of the catalyst support body and an output end of the catalyst support body.

8. The method of claim 1, wherein the step of removing the catalyst support body from the catalyst slurry includes separating the catalyst support body from the sealing cover.

9. The method of claim 1, wherein the step of rotating the catalyst support body is carried out via a clamping mechanism secured to the catalyst support body via a rotary mechanism.

10. The method of claim 1, wherein the step of directing the catalyst slurry within the catalyst support body towards an open output end of the catalyst support body comprises directing a flow of air into the open input end.

11. The method of claim 1 further comprising the steps of:

introducing the catalyst support body to a second sealing cover configured to seal a different portion of the catalyst support body;

introducing either the open output end or the open input end of the catalyst support body into a second catalyst slurry;

directing an amount of the second catalyst slurry into a second inner portion of the catalyst support body;

removing the catalyst support body from the second catalyst slurry;

rotating the catalyst support body relative to the slurry pan; and directing the catalyst slurry within the catalyst support body towards an open end of the catalyst support body.

* * * * *